Aug. 27, 1946.  R. M. GUERKE  2,406,460

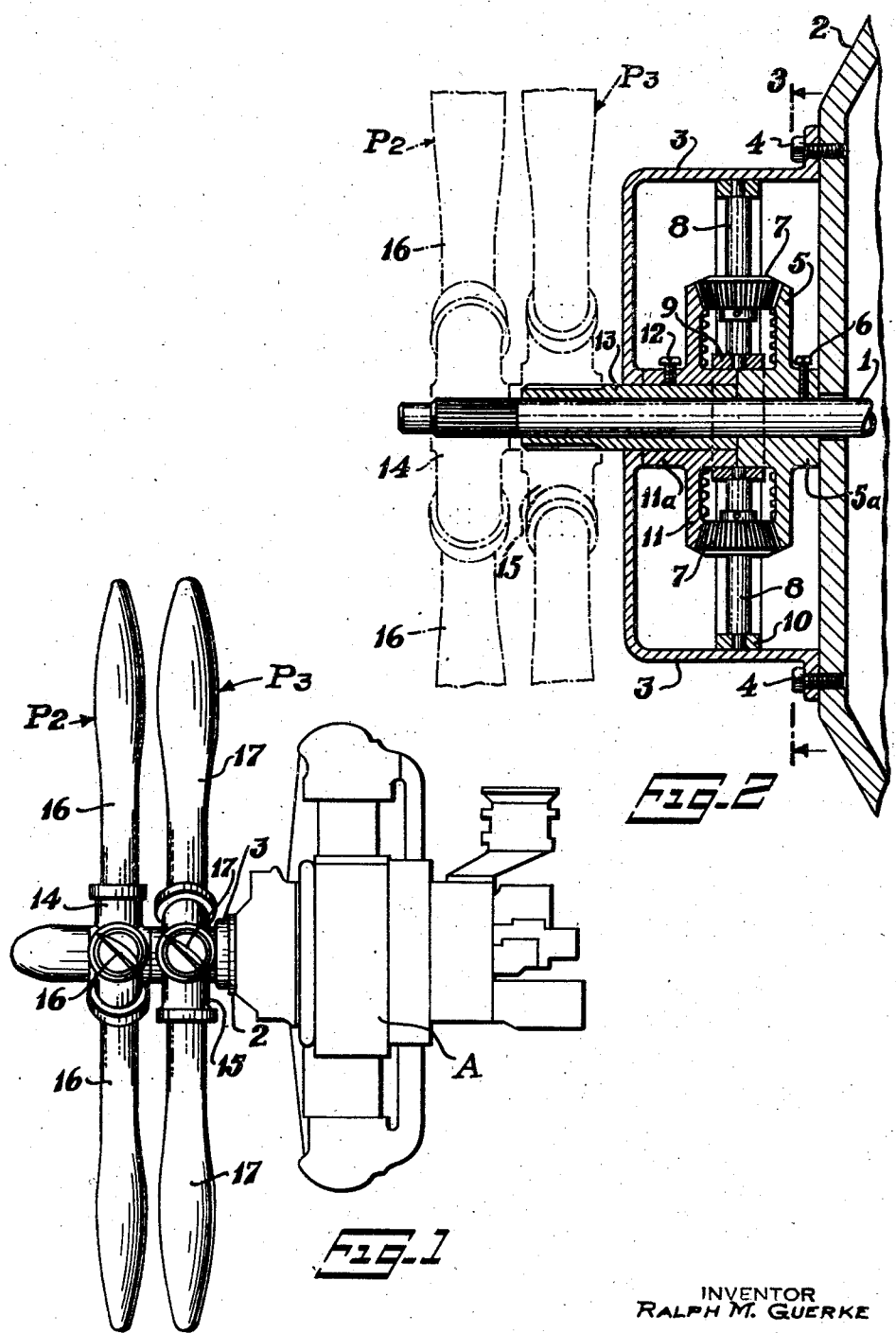

DUAL ROTATION PROPELLER SYSTEM

Filed Feb. 15, 1943  2 Sheets-Sheet 2

INVENTOR
RALPH M. GUERKE.
BY
ATTORNEY

Patented Aug. 27, 1946

2,406,460

UNITED STATES PATENT OFFICE 2,406,460

DUAL ROTATION PROPELLER SYSTEM

Ralph M. Guerke, Verona, N. J., assignor to Curtiss-Wright Corporation, a corporation of Delaware Application February 15, 1943, Serial No. 476,019

1 Claim. (Cl. 170—135.5)

My invention relates to tandem propeller systems for aircraft.

My invention, in a prominent aspect thereof, relates to a tandem propeller system wherein energy which is applied aerodynamically from one propeller to the other and vice versa is not confined to the propeller system. Dissipation of this energy occurs in the manner hereinafter described to thereby substantially decrease undesired vibration of the propellers included in the propeller system.

Various other objects, advantages and features of my invention will become apparent from the following detailed description.

My invention resides in the tandem propeller system, features and combinations of the character hereinafter described and claimed.

For an understanding of my invention and for an illustration of one of the forms thereof, reference is to be had to the accompanying drawings, in which:

Figure 1 is a side elevational view showing a tandem propeller system of the invention;

Fig. 2 is a vertical sectional view, partly in elevation, showing the propeller system of Fig. 1;

Figure 3:
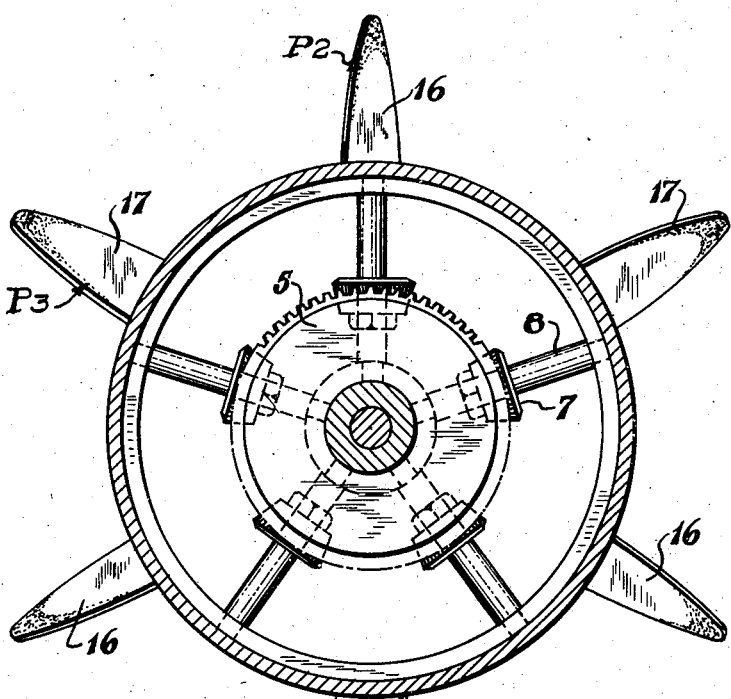
Fig. 3 is a vertical sectional view, partly in elevation, taken on the line 3—3 of Fig. 2 looking in the direction of the arrows.

Referring to Fig. 1, A represents an internal combustion engine such, for example, as one of the radial type which is suitable for operating an airplane. A shaft 1 extends forwardly from the engine A through the nose plate 2 disposed at the forward end of the engine housing stucture, said shaft 1 also extending through and beyond a housing 3 suitably secured, as by screws 4, to said plate 2.

Interiorly of the housing 3, the shaft 1 has the hub 5a of a bevel gear 5 suitably secured thereto, as by a screw 6, said bevel gear 5 meshing with and driving a plurality of bevel pinions 7 secured, respectively, to shafts 8 radially disposed in the housing 3. As shown, the shafts 8 are supported by inner and outer rings 9 and 10, the inner ring 9 being loosely supported on alined surfaces of the aforesaid hub 5a and an adjacent hub 11a of a bevel gear 11 corresponding with the bevel gear 5, and the outer ring 10 being suitably secured to the interior circular surface of the housing 3. The hub 11a of said bevel gear 11 is suitably secured, as by a screw 12, to a sleeve 13 loosely mounted on the shaft 1.

As stated, the shaft 1 extends beyond the housing 3 and the end section thereof has secured thereto a propeller hub 14. The sleeve 13, likewise, extends beyond the housing 1 and the end section thereof, between the propeller hub 14 and the housing 3, has secured thereto a propeller hub 15.

In accordance with one form of the invention, the hub 14 is of such character that it supports three propeller blades 16 spaced from each other by angles of 120 degrees, the blades 16 forming a propeller P2. Further, the hub 15 is of such character that it supports three propeller blades 17 spaced from each other by angles of 120 degrees, the blades 17 forming a propeller P3. Obviously, suitable mechanism may be provided for controlling the pitch of the blades forming the two propellers described above.

From a consideration of Figs. 1 and 2, it will be understood that operation of the engine A effects rotation of the shaft 1 in one direction. As stated, the bevel gear 5 is secured to said shaft 1 and rotates therewith. Power from the bevel gear 5 is transmitted to the sleeve 13 by the bevel pinions 7 and the bevel gear 11. Accordingly, the direction of rotation of the sleeve 13 is opposite that of the shaft 1 and said shaft 1 and the sleeve 13 rotate at the same speed. In view of the foregoing, it will be understood that the propellers P2, P3 rotate in opposite directions and at the same speed.

With respect to the invention of this application, it shall be understood that the term "aerodynamic excitation" as used in this specification and in the appended claims is to be limited to that excitation which is aerodynamically produced by a blade of one of the disclosed propellers on a blade of the other propeller. During operation of the disclosed tandem propeller system and, responsive to this aerodynamic excitation, moments and forces are developed in each of the propellers P2 and P3.

Responsive to vibratory forces acting along the thrust axis of the propellers P2 and P3, the following conditions develop: First, when the hub of the forward propeller P2 exerts a forward vibratory force and the hub of the rear propeller P3 exerts a backward vibratory force, the forces transmitted along the shaft 1 and the sleeve 13, respectively, are balanced either entirely or partially, depending upon the magnitudes of the forces involved, in the bevel pinions 7 between the bevel gears 5 and 11; second, when the hub of the forward propeller P2 exerts a backward vibratory force and the hub of the rear propeller P3 exerts a forward vibratory force, the forces transmitted along the shaft 1 and sleeve 13, respectively, are balanced either entirely or partially, depending upon the magnitudes of the forces involved, in the screws 4, the latter connecting the housing 3 to the nose plate 2 in the manner hereinbefore described. If not balanced in this manner, the forces pass from the nose plate 2 to the engine A and its mount where they are effectively damped.

As will be understood in view of the foregoing, a corresponding action exists as regards the moments which are developed in each of the propellers P2 and P3.

In tandem propeller systems which operate in accordance with my invention, there is a structure, such as the nose plate 2 herein disclosed, which receives unbalanced forces and/or moments and from which they are transmitted to the engine and its mount.

When these forces and moments balance each other before reaching the nose plate 2, or equivalent, or in the screws 4, or equivalent, as described above, the mode of vibration of the propeller system is reactionless. That is, the energy which is applied aerodynamically from one propeller to the other and vice versa is confined to the propeller system and, hence, must be dissipated by that system with consequent liability of destructive damage thereto.

When the forces and moments do not balance each other completely, a reactive mode of vibration of the propeller system is established. That is, energy which is applied aerodynamically from one propeller to the other and vice versa is not confined to the propeller system and, hence, is damped by the engine and its mount.

As stated above, the propeller system of my invention comprises two three-bladed propellers P2 and P3. In accordance with the invention, the blades 17 of the rear propeller P3 are thicker to substantial extent than are the blades 16 of the front propeller P2. As hereinafter explained in detail, the propeller system is of this character in order that the two propellers P2 and P3 will become resonant, due to aerodynamic excitation, at substantially different rotative speeds, respectively. Alternatively, the blades of the front propeller P2 may be thicker than the blades of the rear propeller P3.

Figure 4:
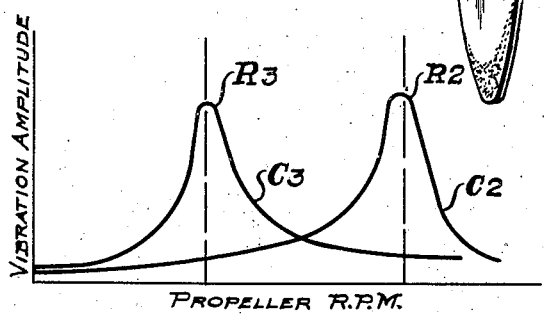
Figs. 4 and 5 are graphs indicative of blade vibration amplitudes.
Figure 5:
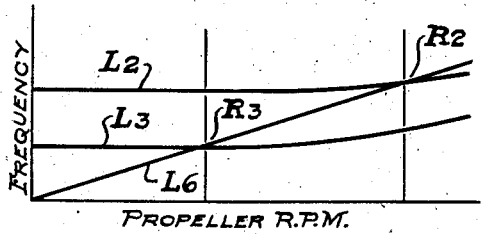

In Fig. 5, the line L2 represents the natural frequency of the forward propeller P2 and the line L3 represents the natural frequency of the rear propeller P3 at various propeller speeds. The line L6 indicates 6th order propeller excitation (6×propeller R. P. M.), such 6th order excitation being the reaction between both of the propellers P2 and P3. The line L6 intersects the line L3 at R3 and said line L6 intersects the line L2 at R2. The curves C3 and C2, Fig. 4, indicate vibration conditions of the respective propellers P3 and P2 in response to aerodynamic excitation.

Thus, the aerodynamic excitation of the propeller P2 on the propeller P3 becomes resonant with the natural frequency of the propeller P3 at R3, and the aerodynamic excitation of the propeller P3 on the propeller P2 becomes resonant with the natural frequency of the propeller P2 at R2.

In the system as disclosed, the propellers P3 and P2 become resonant, due to aerodynamic excitation, at such different rotative speeds, respectively, that the resonant periods of the propellers do not overlap. As will be obvious from a consideration of Fig. 4, vibration of the front propeller P2 is small when the rear propeller P3 becomes resonant at R3. Similarly, vibration of the rear propeller P3 is small when the forward propeller P2 becomes resonant at R2. Therefore, during the resonant periods of the two propellers, there is only slight balancing of the forces and moments developed by each in response to aerodynamic excitation. The disclosed tandem propeller system, then, is reactive. Energy which is applied aerodynamically from one propeller to the other and vice versa is not confined to the propeller system. Such energy is damped by the engine and its mount.

Merely for purposes of explanation and without limitation of the invention, the disclosed tandem propeller system may be of such character that the rotative speed of the propeller P3 is approximately 400 R. P. M. when it vibrates at approximately 2400 cycles per minute to become resonant at R3, and the rotative speed of the propeller P2 is approximately 500 R. P. M. when it vibrates at approximately 3000 cycles per minute to become resonant at R2.

As stated above, the invention involves a tandem propeller system wherein the blades of the rear propeller are thicker to a desired extent than are the blades of the front propeller, this arrangement being provided to cause the two propellers P2 and P3 to become resonant, due to aerodynamic excitation, at substantially different rotative speeds, respectively. This desirable result may be obtained otherwise than as described with respect to the blade thickness. Thus, for example, all of the blades of the two propellers may have the same thickness and the blades of one of the propellers may be longer than the blades of the other propeller to such extent as may be desirable in order to produce the desired resonant conditions. Alternatively, the blades of the two propellers may be identical, as regards thickness and length, each of the blades of one of the propellers having associated therewith a rib, not shown, these ribs, during operation of the tandem propeller system, serving to change the resonant conditions of the propellers P2 and P3 in the desired manner. Still further, the propellers P2 and P3 may be formed of different materials, respectively. Thus, the blades of one of the propellers may be hollow and formed from steel while the blades of the other propeller may be formed from solid aluminum or the like.

In general, therefore, in accordance with my invention, one propeller of the tandem propeller system differs structurally from the other propeller in the sense that the blades thereof are longer or shorter, thicker or thinner, formed from different materials, etc.

Although the invention has been described in connection with a propeller system comprising two three-bladed propellers, it shall be understood that the invention is not to be thus limited. Alternatively, for example, the propeller system of my invention may comprise two two-bladed propellers, two four-bladed propellers, etc.

In Figs. 2 and 3 of the drawings, I have shown a simplified arrangement for producing rotative movement, in opposite directions, of the propellers P2 and P3. As regards the arrangement shown, it shall be understood that the shafts 8 may be fixed non-rotatably in position and the bevel pinions 7 secured rotatively to the respective shafts 8 in suitable manner.

As known in the art, there are many arrangements for effecting rotative movement in opposite directions of the two propellers of a tandem propeller system. It shall be understood that any of such known arrangements as may be suitable may be substituted for the simplified arrangement illustrated in Figs. 2 and 3 of this application.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claim to cover all such changes and modifications.

What is claimed as new and desired to be secured by Letters Patent is:

A propeller system comprising propellers arranged in tandem formation, an engine, a shaft driven thereby for operating one propeller, a sleeve rotatable on said shaft for operating the other propeller, gearing disposed between said engine and the propellers for rotating said sleeve oppositely as regards the rotation of said shaft, the ratio of the speeds of rotation of said shaft and sleeve being fixed, one of said propellers having its blades thicker than the other and of a substantially different resonant period from the other, whereby their respective resonant periods occur at substantially different rotative speeds, each of said propellers having the same number of blades as the other propeller and means for transmitting the unbalanced moments and forces resulting from aerodynamic excitation to said engine and its mount, said means comprising a thrust-receiving member for said shaft and said sleeve, said thrust-receiving member being associated with said engine.

RALPH M. GUERKE.